US012669096B2

(12) United States Patent
Uchida

(10) Patent No.: US 12,669,096 B2
(45) Date of Patent: Jun. 30, 2026

(54) VEHICLE WITH ENGINE

(71) Applicant: TOYOTA JIDOSHA KABUSHIKI KAISHA, Toyota (JP)

(72) Inventor: Akito Uchida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1 day.

(21) Appl. No.: 19/001,778

(22) Filed: Dec. 26, 2024

(65) Prior Publication Data

US 2025/0270967 A1    Aug. 28, 2025

(30) Foreign Application Priority Data

Feb. 26, 2024    (JP) ................................. 2024-026465

(51) Int. Cl.
*F02D 41/22* (2006.01)
*B60K 35/10* (2024.01)
*B60K 35/22* (2024.01)

(52) U.S. Cl.
CPC .............. *F02D 41/22* (2013.01); *B60K 35/10* (2024.01); *B60K 35/22* (2024.01)

(58) Field of Classification Search
CPC .......... F02D 41/22; B60K 35/10; B60K 35/22
See application file for complete search history.

(56) References Cited

U.S. PATENT DOCUMENTS 10,352,438 B1 * 7/2019 Wise .................. F16H 61/0213
10,961,945 B1 * 3/2021 Han ......................... F02D 41/22

11,773,791 B1 * 10/2023 Gwidt ................. F02D 41/3017
                                                            123/299
2007/0163376 A1 * 7/2007 Baldet .................... B60K 35/10
                                                            74/473.31
2018/0215281 A1 * 8/2018 Basler ................... B60W 10/26
2019/0136782 A1 * 5/2019 Faied ................. F02D 41/3076
2019/0316554 A1 * 10/2019 Berg .................. F02D 41/3082
2019/0389452 A1 * 12/2019 Duan .................... B60W 10/30
2022/0309282 A1 * 9/2022 Kim ........................ G06V 20/58
2023/0031444 A1 * 2/2023 Ravichandran ..... F02N 11/0859
2023/0085950 A1 * 3/2023 Weston .............. G01C 21/3859
                                                            701/123
2023/0211797 A1 * 7/2023 Lee .................... B60W 50/0098
                                                            701/36

(Continued)

FOREIGN PATENT DOCUMENTS

CN        106293032 A  *  1/2017  ............... B60Q 9/00
CN        110463166 A  *  11/2019  ........... H04W 48/04

(Continued)

*Primary Examiner* — Hung Q Nguyen
(74) *Attorney, Agent, or Firm* — Oliff PLC

(57)                    ABSTRACT

A vehicle, with an engine, includes an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit, wherein the engine control unit is configured to reject switching to the circuit mode regardless of the request, when the engine control unit determines that a part of combustion conditions among all combustion conditions for stable combustion of fuel supplied to the engine in the circuit mode is not satisfied.

4 Claims, 5 Drawing Sheets

(56) References Cited

U.S. PATENT DOCUMENTS

2023/0325168 A1 * 10/2023 Lewandowski ....... B60W 40/09
717/118

FOREIGN PATENT DOCUMENTS

| | | | | | |
|---|---|---|---|---|---|
| DE | 102015216817 A1 | * | 3/2017 | ............ | B60W 50/14 |
| DE | 102017207897 A1 | * | 11/2018 | ........ | B60W 50/0098 |
| DE | 102020103342 A1 | * | 8/2020 | ............ | B60W 10/11 |
| JP | 2010-167827 A | | 8/2010 | | |
| JP | 2015-199382 A | | 11/2015 | | |
| KR | 20220119726 A | * | 8/2022 | ....... | G08G 1/096725 |
| KR | 20230075947 A | * | 5/2023 | .............. | B60H 1/08 |

* cited by examiner

15

ENGINE ECU

15A          CPU

15E

15B          RAM

15C          ROM

15D          INPUT AND OUTPUT I/F

REQUEST ID:#1

TORQUE MAP:MP1

15C

ROM

VEHICLE WITH ENGINE

CROSS-REFERENCE TO RELATED APPLICATION

This application is based upon and claims the benefit of priority of the prior Japanese Patent Application No. 2024-026465, filed on Feb. 26, 2024, the entire contents of which are incorporated herein by reference.

TECHNICAL FIELD

The present disclosure relates to a vehicle with an engine.

BACKGROUND

A limiter is known to limit various functions for safety setting, fuel saving, and the like of a vehicle. As functions for safety setting, for example, a sideslip prevention function such as an anti-lock brake system is known. As functions for saving fuel, for example, a variable cylinder management system is known in which "one third or half" of the engine is automatically stopped depending on a traveling state to save fuel.

Further, a technique is known in which a current position of the vehicle is identified from data acquired by a global positioning system (GPS) and map information, and the amount of steering force assist is changed if the vehicle is on a circuit road. In addition, a technique is known in which the above-described limiter is released when it is determined that the vehicle is positioned in a circuit (see, for example, Japanese Unexamined Patent Application Publication No. 2015-199382).

When the limiter is released in a case where the vehicle is positioned in the circuit, for example, fuel saving is mitigated. However, even if the fuel saving is mitigated, the fuel might not be stably combusted inside the engine depending on, for example, the fuel injection amount, the temperature of intake air taken into the engine, and the like. In this case, even if the mode is switched to the circuit mode for improving the traveling performance of the vehicle on the circuit road, the traveling performance of the vehicle might not be sufficiently improved.

Therefore, for example, when switching to the circuit mode is permitted, it is desirable to determine in advance whether or not the engine is suitable for all of a large number of combustion conditions for determining whether or not the fuel supplied to the engine is stably combusted. However, if it is individually determined whether all of such combustion conditions are satisfied or not, the number of steps for meeting the combustion conditions might increase. Similarly, even when the switching to the circuit mode is rejected, the number of adaptation steps might increase. If the number of adaptation steps increases, it might take time to adapt the combustion conditions.

SUMMARY

It is therefore an object of the present disclosure to provide a vehicle, with an engine, reducing the number of adaptation steps for combustion conditions of fuel when switching to the circuit mode is rejected.

The above object is achieved by a vehicle includes: an engine; and an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit, wherein the engine control unit is configured to reject switching to the circuit mode regardless of the request, when the engine control unit determines that a part of combustion conditions among all combustion conditions for stable combustion of fuel supplied to the engine in the circuit mode is not satisfied.

The engine control unit may be configured to turn off the circuit mode, after the vehicle stops so as to stabilize behavior of the vehicle, in a case where the engine control unit determines that the part of the combustion conditions is not satisfied while the engine is controlled in the circuit mode and the vehicle is traveling.

The vehicle may further include a display control unit configured to control display of a display device provided in a vehicle cabin of the vehicle, wherein the display control unit may be configured to output a display requesting the vehicle to stop to the display device, on a basis of an instruction transmitted from the portable terminal, when the portable terminal determines that the current position of the vehicle is outside the circuit, and the engine control unit may be configured to turn off the circuit mode, after the vehicle stops so as to stabilize behavior of the vehicle.

The vehicle may further include a communication control unit provided in the vehicle and configured to control communication between the portable terminal and the engine control unit, wherein the engine control unit may be configured to turn off the circuit mode, when the engine control unit does not receive a signal transmitted from the communication control unit.

The engine control unit may be configured to exclude determination related to fail-safe control for the engine during a period from a first time to a second time, the first time may be a time when a starter for starting the engine is turned on, and the second time may be a time when a predetermined time elapses from a time when the starter is turned off.

DETAILED DESCRIPTION

Hereinafter, embodiments of the present disclosure will be described with reference to the drawings.

Figure 1:
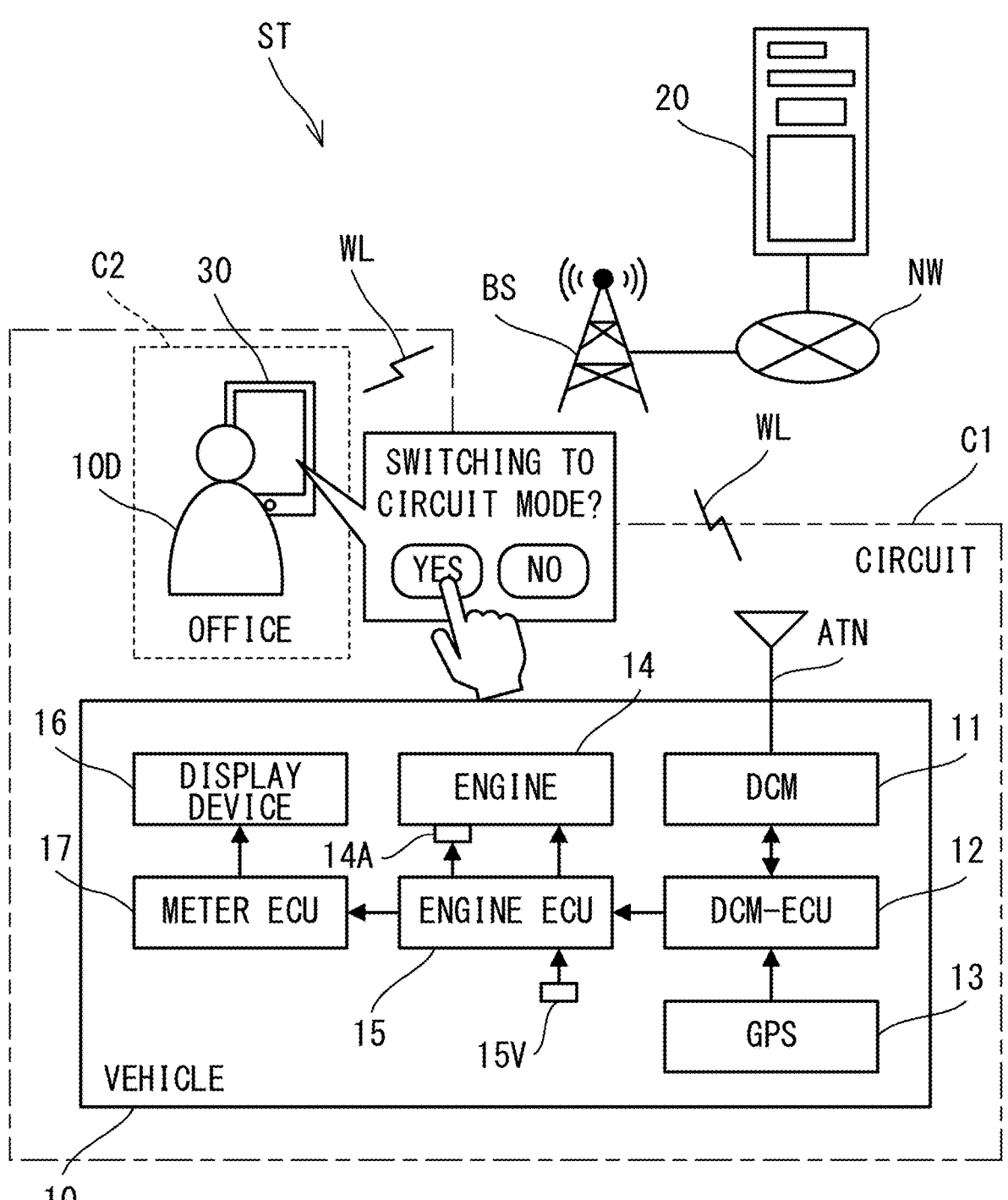
FIG. 1 illustrates an example of a vehicle control system.

As illustrated in FIG. 1, a vehicle control system ST includes a vehicle 10, a server 20, and a portable terminal 30. Although a smartphone is illustrated as an example of the portable terminal 30 in FIG. 1, a tablet terminal may be used instead of the smartphone. The vehicle 10, the server 20, and the portable terminal 30 cooperate with one another, whereby the vehicle control system TS provides a service limited to a circuit C1 to a driver 10D who is a user of the vehicle 10.

For example, when the vehicle 10 enters the circuit C1 and the driver 10D operates the portable terminal 30 in an office C2 of the circuit C1 to activate a circuit application, the portable terminal 30 acquires GPS information including a current position of the vehicle 10 via the server 20. The circuit application is application software installed in the portable terminal 30 and is associated with the vehicle 10. The circuit application is used when the vehicle 10 is controlled in a circuit mode for improving the traveling performance of the vehicle 10.

The vehicle 10 includes a data communication module (DCM) 11 as a wireless communication device to which an antenna ATN is connected, a DCM-electronic control unit (ECU) 12, and a GPS 13. The DCM-ECU 12 is an example of a communication control unit, and controls communication between the portable terminal 30 and the engine ECU 15 described later. The GPS 13 measures the positions of the vehicle 10 and holds GPS information including the measured positions. The DCM-ECU 12 acquires the GPS information from the GPS 13 and transmits the GPS information to the server 20 by radio wave WL via the DCM 11 and the antenna ATN. Therefore, when the server 20 requests the vehicle 10 to transmit the GPS information, the server 20 acquires the GPS information from the vehicle 10.

The GPS information reaches the server 20 via the base station BS and the communication network NW. The communication network NW includes one or both of the Internet and a local area network (LAN). When the portable terminal 30 requests the server 20 to transmit the GPS information, the server 20 transmits the GPS information to the portable terminal 30 by the radio wave WL via the communication network NW and the base station BS. Thus, the portable terminal 30 acquires the GPS information of the vehicle 10.

The server 20 also holds map information (hereinafter referred to as circuit information) including the position or area of the circuit C1. When the portable terminal 30 requests the server 20 to transmit the circuit information, the server 20 transmits the circuit information to the portable terminal 30 by the radio wave WL via the communication network NW and the portable base station BS. Thus, the portable terminal 30 acquires the circuit information.

The portable terminal 30 determines whether the current position of the vehicle 10 is within the circuit C1 or not on the basis of the circuit information and the GPS information. When the vehicle 10 is not located in the circuit C1, the portable terminal 30 rejects the switching to the circuit mode and presents this rejection to the driver 10D on the screen.

On the other hand, when the vehicle 10 is located in the circuit C1, the portable terminal 30 presents a notice about the switching to the circuit mode to the driver 10D, and requests the driver 10D to accept the switching. In this way, in the circuit mode, it is determined whether or not the position of the vehicle 10 is within the circuit C1. Therefore, the circuit mode is different from a sport mode (or a sport traveling mode) in which the traveling performance is improved only by switching of a switch provided in the vehicle cabin of the vehicle 10 without performing such determination.

When the portable terminal 30 receive the acceptance of the switching from the driver 10D, the portable terminal 30 transmits circuit-mode request information (hereinafter, referred to as request ID (Identifier)) including the acceptance of the switching to the server 20. The request ID is identification information for requesting the vehicle 10 to switch to the circuit mode. The request ID is prepared and defined for each version of the circuit application. Therefore, when the version of the circuit application is updated by version upgrade, different independent request ID is transmitted based on the update of the version.

When the request ID is transmitted from the portable terminal 30, the server 20 generates switching information including the request ID and transmits the switching information to the vehicle 10. The switching information is information for switching the traveling performance of the vehicle 10 to traveling performance specialized for traveling in the circuit C1, which will be described in detail later. For example, the server 20 transmits the switching information to the vehicle 10 by a short message service (SMS).

In the vehicle 10, the DCM-ECU 12 receives the switching information from the server 20 via the DCM 11 and the antenna ATN. The vehicle 10 includes an engine 14, an engine ECU 15, a display device 16, and a meter ECU 17. The engine ECU 15 is an example of an engine control unit. The meter ECU 17 is an example of a display control unit. The engine 14 is provided with a starter 14A for starting the engine 14. A speed sensor 15V for detecting the speed of the vehicle 10 is connected to the engine ECU 15. The display device 16 is provided in the vehicle cabin of the vehicle 10. The DCM-ECU 12, the engine ECU 15, and the meter ECU 17 achieves the control device for the vehicle 10.

When the DCM-ECU 12 receives the switching information, the DCM-ECU 12 transmits the switching information to the engine ECU 15 by using a controller area network (CAN) signal. Thus, the engine ECU 15 receives the switching information. When receiving the switching information, the engine ECU 15 determines whether a first condition and a second condition, which are a part of all of at least three or more conditions for stably burning fuel supplied to the engine 14 in the circuit mode, are not satisfied. The first condition and the second condition are examples of combustion conditions. All of the at least three conditions including the first condition and the second condition are examples of the combustion condition.

For example, the at least three conditions include the first condition related to a temperature of coolant that cools the engine 14, the second condition related to an atmospheric pressure, and a third condition related to an injection amount of the fuel supplied to the engine 14. The at least three conditions may include, for example, a fourth condition related to a rotational speed of the engine 14, a fifth condition related to a temperature of the outside air, and a sixth condition related to communication between the DCM-ECU 12 and the engine ECU 15. The engine ECU 15 determines whether or not, for example, both of the first condition and the second condition are unsatisfied among the first to sixth conditions. In this way, the engine ECU 15 determines whether both the first and second conditions are satisfied or not. Therefore, the engine ECU 15 reduces the number of adaptation steps as compared with the case where it is determined whether or not all the conditions from the first to sixth conditions are satisfied.

Here, when either one of the first condition and the second condition is satisfied, the engine ECU 15 permits the switching to the circuit mode. Thus, the engine ECU 15 changes the control of the engine 14 based on the request ID included in the switching information. That is, the engine ECU 15 controls the engine 14 in the circuit mode.

For example, the engine ECU 15 changes a torque upper limit map (hereinafter, simply referred to as torque map) that defines an upper limit of the torque of the engine 14. Thus, the engine 14 is operated in the circuit mode in which high torque is output. The circuit mode improves the traveling performance of the vehicle 10 as compared to the normal traveling mode. In this way, the use of the circuit mode is accepted, and thus the vehicle control system ST provides a service of conveying the enjoyment of the motor sports to the driver 10D.

On the other hand, when both the first condition and the second condition are not satisfied, the engine ECU 15 rejects the switching to the circuit mode. In this case, the engine ECU 15 notifies the portable terminal 30 of the switching error via the DCM-ECU 12, the server 20, or the like. Thus, the driver 10D confirms that the switching to the circuit mode is rejected.

When the vehicle 10 moves from the inside to the outside of the circuit C1, the portable terminal 30 determines that the current position of the vehicle 10 is outside the circuit C1. In this case, the portable terminal 30 notifies the server 20 of predetermined information including the fact that the current position of the vehicle 10 is outside the circuit C1. The server 20 transmits an instruction including control information for controlling the display of the display device 16 to the meter ECU 17 on the basis of the predetermined information. The meter ECU 17 outputs a display requesting the stopping of the vehicle 10 to the display device 16 on the basis of the instruction transmitted from the server 20.

Thus, it is assumed that the driver 10D shifts to an action of stopping the vehicle 10 by the brake operation. The instruction transmitted from the server 20 reaches the meter ECU 17 via the DCM-ECU 12, the engine ECU 15, or the like. The engine ECU 15 determines whether the vehicle 10 is stopped or not on the basis of the speed detected by the speed sensor 15V. The engine ECU 15 turns off the circuit mode after the vehicle 10 stops. If the engine ECU 15 turns off the circuit mode while the vehicle 10 is traveling, the behavior of the vehicle 10 might not be stable. However, such instability is suppressed, since the engine ECU 15 turns off the circuit mode after the vehicle 10 stops.

Next, the portable terminal 30 will be described in detail with reference to FIG. 2A.

Figures 2A, 2B:
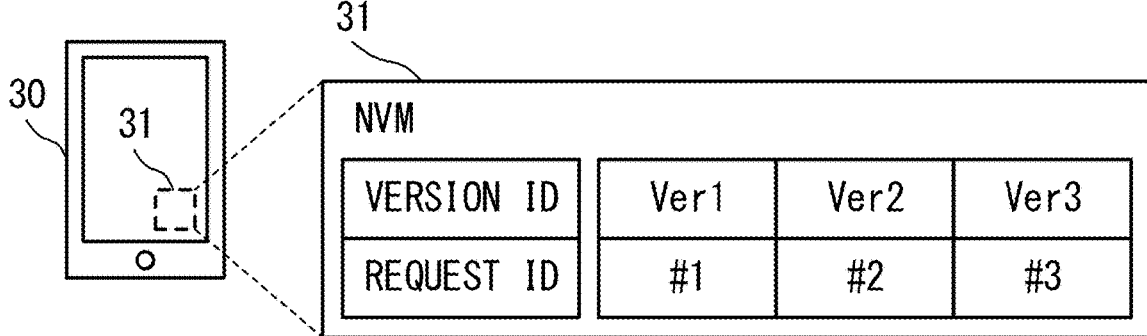
FIG. 2A is a view illustrating an example of a correspondence table held by a portable terminal.
FIG. 2B illustrates an example of a hardware configuration of an engine ECU.

As illustrated in FIG. 2A, the portable terminal 30 includes a non-volatile memory (NVM) 31. The NVM 31 stores a correspondence table of version IDs for identifying the versions of the circuit applications and request IDs. For example, a request ID "#1" is associated with a version ID "Ver1". A request ID "#2" is associated with a version ID "Ver2". Thus, when the version of the application is updated from, for example, "Ver1" to "Ver2", the portable terminal 30 transmits the request ID "#2".

Next, the engine ECU 15 will be described in detail with reference to FIG. 2B. Hardware configurations of the DCM-ECU 12 and the meter ECU 17 are basically the same as the hardware configuration of the engine ECU 15, and thus detailed description thereof will be omitted. The engine ECU 15 indirectly communicates with the portable terminal 30 via the DCM-ECU 12, the server 20, or the like.

The engine ECU 15 is a hardware circuit including a central processing unit (CPU) 15A, a random access memory (RAM) 15B, a read only memory (ROM) 15C, and an input/output interface (I/F) 15D. The CPU 15A is an example of a processor and indirectly communicates with the portable terminal 30. The CPU 15A, the RAM 15B, the ROM 15C, and the input and output I/F 15D are connected to one another through an internal bus 15E. Although omitted in FIG. 2B, the input and output I/F 15D is connected to the DCM-ECU 12, the engine 14, and the meter ECU 17. At least the CPU 15A and the RAM 15B cooperate with each other to realize a computer.

The software pre-stored in the ROM 15C is stored in the RAM 15B mentioned above by the CPU 15A. The CPU 15A executes the stored software, and thereby the CPU 15A executes a series of processes described later. The software may be in accordance with a processing sequence diagram described later.

The ROM 15C stores a plurality of torque maps respectively for the request IDs. Each of the torque maps defines the upper limit of the torque of the engine 14. Since the request IDs are prepared and defined for respective versions of the circuit application, each torque map is stored in the ROM 15C for each version of the circuit application.

Figure 3:
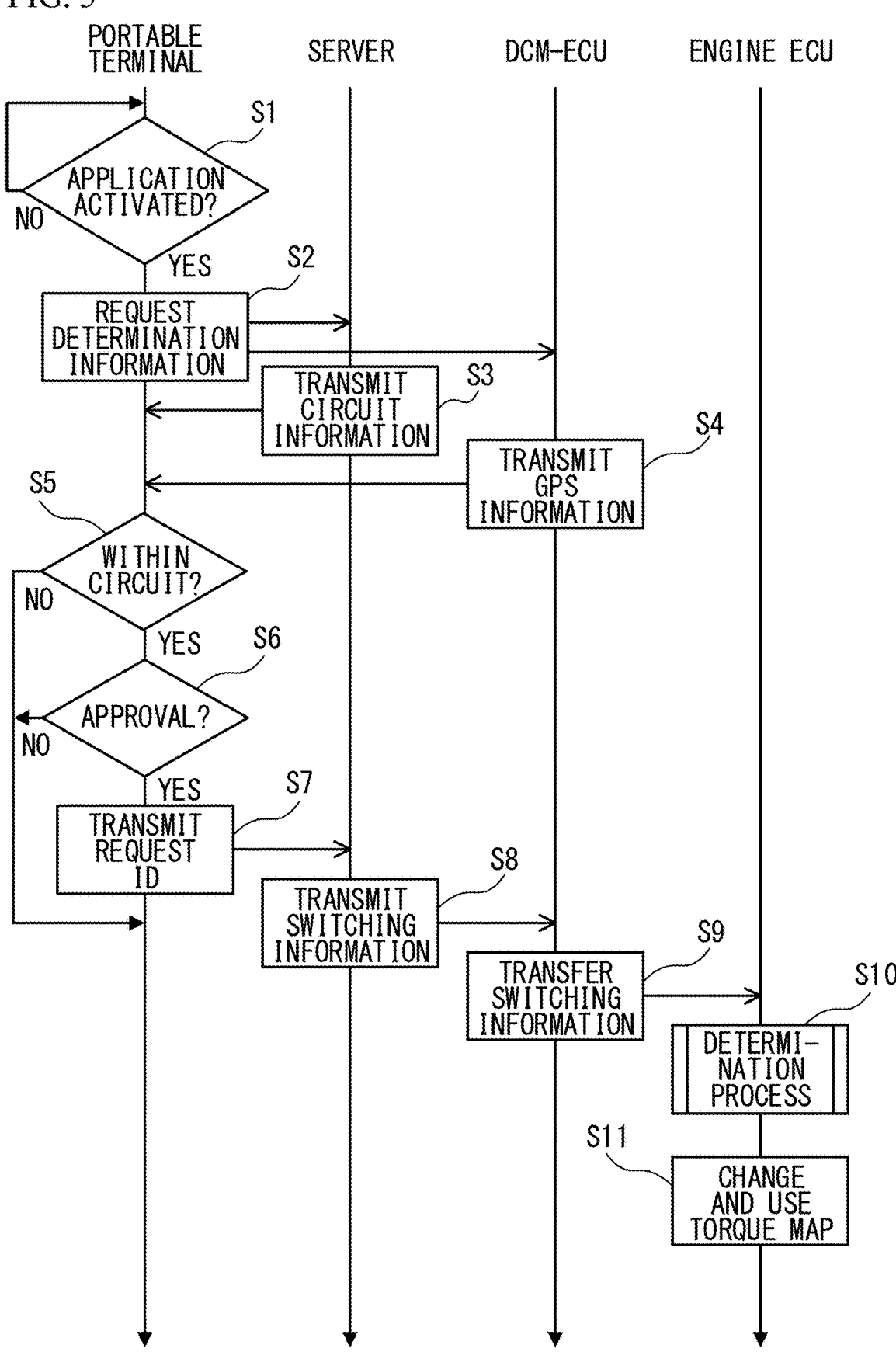
FIG. 3 is a processing sequence diagram illustrating an example of an operation of the vehicle control system.

Next, the operation of the vehicle control system ST will be described with reference to FIG. 3.

First, the portable terminal 30 waits until the circuit application is activated (step S1: NO). For example, the process waits until the driver 10D performs a predetermined operation to instruct activation of the circuit application on the icon of the circuit application displayed on the portable terminal 30. When a predetermined operation is performed on the icon of the circuit application and the circuit application is activated (step S1: YES), the portable terminal 30 requests the server 20 and the DCM-ECU 12 for determination information (step S2). The determination information is information for determining whether or not the position of the vehicle 10 is within the circuit C1.

For example, the portable terminal 30 directly requests the server 20 to transmit the determination information. On the other hand, the portable terminal 30 indirectly requests the DCM-ECU 12 for the determination information. That is, the portable terminal 30 requests the DCM-ECU 12 for the determination information via the server 20. When the determination information is requested from the portable terminal 30, the server 20 transmits the circuit information as the determination information to the portable terminal 30 (step S3). When the determination information is requested from the portable terminal 30 via the server 20, the DCM-ECU 12 transmits the GPS information as the determination information to the portable terminal 30 via the server 20 (step S4).

The portable terminal 30 determines whether or not the current position of the vehicle 10 is within the circuit C1 (step S5). If the current position is not within the circuit C1 (step S5: NO), the portable terminal 30 skips the subsequent processing. In this case, the portable terminal 30 rejects the switching to the circuit mode, and thus the control of the vehicle 10 in the circuit mode is stopped.

On the other hand, when the current position is within the circuit C1 (step S5: YES), the portable terminal 30 determines whether or not there is an approval for switching to the circuit mode (step S6). For example, the portable terminal 30 presents a notice about the switching to the circuit mode to the driver 10D on the screen of the portable terminal 30, and requests the driver 10D to accept the switching. The notes include, for example, an explanation about deterioration of the engine 14. When the driver 10D performs an operation to reject the switching to the circuit mode, the portable terminal 30 determines that the driver 10D does not accept the switching to the circuit mode (step S6: NO). In this case, the portable terminal 30 rejects the switching to the circuit mode, and thus the control of the vehicle 10 in the circuit mode is stopped.

On the other hand, when the driver 10D performs an operation of accepting the switching to the circuit mode (for example, pressing of a "YES" button as illustrated in FIG. 1), the portable terminal 30 determines that the acceptance of the switching to the circuit mode is made (step S6: YES). In this case, the portable terminal 30 transmits the request ID to the server 20 (step S7). More specifically, the portable terminal 30 checks the version ID for identifying the version of the current circuit application installed in the portable terminal 30, and specifies and transmits the request ID corresponding to the version ID. For example, if the version of the circuit application identified by the version ID "Ver2" is installed in the portable terminal 30, the portable terminal 30 transmits the request ID "#2".

When the server 20 receives the request ID, the server 20 transmits the switching information to the DCM-ECU 12 (step S8). More specifically, when the server 20 receives the request ID, the server 20 generates the switching information including the received request ID and transmits the switching information to the DCM-ECU 12. When the DCM-ECU 12 receives the switching information, the DCM-ECU 12 transfers the switching information to the engine ECU 15 (step S9).

When the engine ECU 15 receives the switching information, the engine ECU 15 performs a determination process (step S10). The determination process is a process of determining whether both of the first condition and the second condition among the at least three conditions are unsatisfied or not. The determination process will be described in detail later. When one of the first condition and the second condition is satisfied, the engine ECU 15 changes the torque map and immediately uses the changed torque map (step S11). More specifically, when one of the first condition and the second condition is satisfied, the engine ECU 15 extracts the request ID from the switching information, and specifies and selects the torque map corresponding to the extracted request ID. For example, when the request ID "#2" is extracted, the engine ECU 15 specifies and selects one of the plurality of torque maps associated with the request ID "#2".

If the torque map associated with the request ID "#1" is used before the switching information is received, the engine ECU 15 changes the torque map to the torque map associated with the request ID "#2". When the engine ECU 15 changes the torque map, the engine ECU 15 uses the changed torque map for controlling the vehicle 10.

Figure 4:
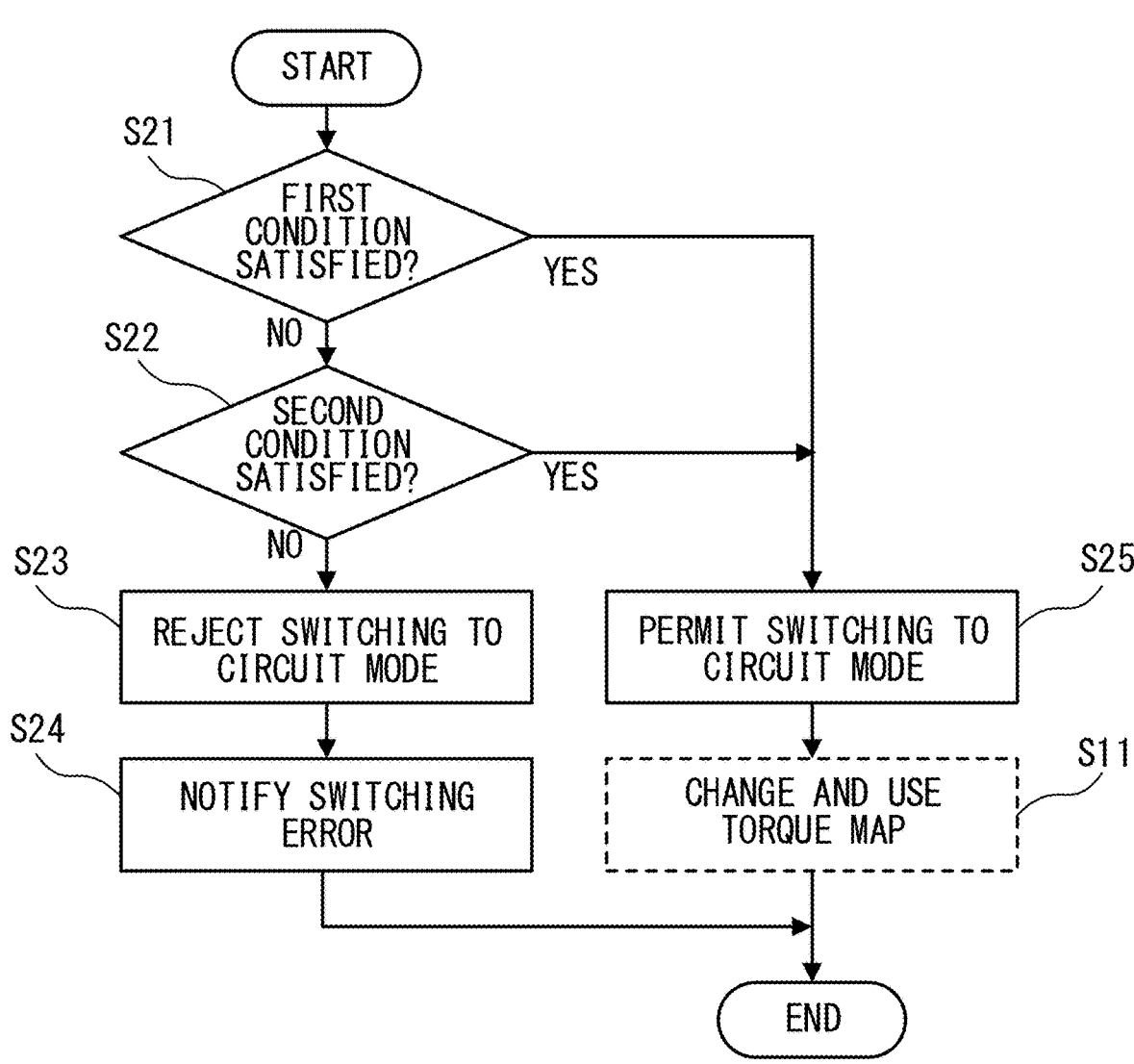
FIG. 4 is a flowchart illustrating an example of a determination process.

The details of the determination process will be described with reference to FIG. 4.

As described above, when the engine ECU 15 receives the switching information, the engine ECU 15 determines whether or not the first condition is satisfied (step S21). For example, the engine ECU 15 determines whether or not the temperature of the coolant that cools the engine 14 is equal to or higher than a threshold temperature as the first condition. The threshold temperature is set to a coolant temperature at which the fuel supplied to the engine 14 is stably combusted, on the basis of design, experiments, and the like.

When the first condition is not satisfied because the coolant temperature is lower than the threshold temperature (step S21: NO), the engine ECU 15 then determines whether a second condition is satisfied or not (step S22). For example, the engine ECU 15 determines whether or not the atmospheric pressure is equal to or higher than a threshold pressure as the second condition. The threshold pressure is set to an air pressure at which the fuel supplied to the engine 14 is stably combusted, on the basis of design, experiments, and the like.

If the second condition is not satisfied because the atmospheric pressure is smaller than the threshold pressure (step S22: NO), the engine ECU 15 rejects the switching to the circuit mode (step S23). That is, when both the first condition and the second condition are not satisfied, the engine ECU 15 may not be able to stably burn the fuel supplied to the engine 14. In such a case, the engine ECU 15 rejects the switching to the circuit mode because the control of the engine 14 in the circuit mode may not be suitable.

If the switching to the circuit mode is rejected, the engine ECU 15 notifies a switching error (step S24), and the determination process is terminated. More specifically, the engine ECU 15 notifies the portable terminal 30 of the switching error. The switching error reaches the portable terminal 30 via the DCM-ECU 12, the server 20, and the like. Thus, the driver 10D confirms that the switching to the circuit mode is rejected. When the switching to the circuit mode is rejected, the engine ECU 15 skips the process of step S11 described above.

On the other hand, when either the first condition or the second condition is satisfied (step S21: YES, step S22: YES), the engine ECU 15 permits the switching to the circuit mode (step S25). That is, when the first condition is satisfied because the coolant temperature is equal to or higher than the threshold temperature, the engine ECU 15 permits the switching to the circuit mode. When the second condition is satisfied because the atmospheric pressure is equal to or higher than the threshold pressure, the engine ECU 15 permits the switching to the circuit mode. When the switching to the circuit mode is permitted, the engine ECU 15 executes the processing of the above-described step S11, and ends the determination processing.

In this way, the engine ECU 15 rejects the switching to the circuit mode. when it is determined that both the first condition and the second condition among at least three or more conditions under which the fuel supplied to the engine 14 stably burns are not satisfied. Thus, the engine ECU 15 reduces the number of the adaptation steps, as compared with the case where it is individually determined whether or not all of at least three or more conditions are satisfied. As a result, the conformity time is reduced as compared to the case where it is individually determined whether or not all of at least three or more conditions are satisfied.

When the engine ECU 15 determines that both the first condition and the second condition are not satisfied while the engine 14 is controlled in the circuit mode and the vehicle 10 is traveling, the engine ECU 15 turns off the circuit mode after the vehicle 10 is stopped. If the engine ECU 15 turns off the circuit mode while the vehicle 10 is traveling, the behavior of the vehicle 10 might not be stable. The engine ECU 15 turns off the circuit mode after the vehicle 10 is stopped, thereby suppressing such instability.

Figure 5:
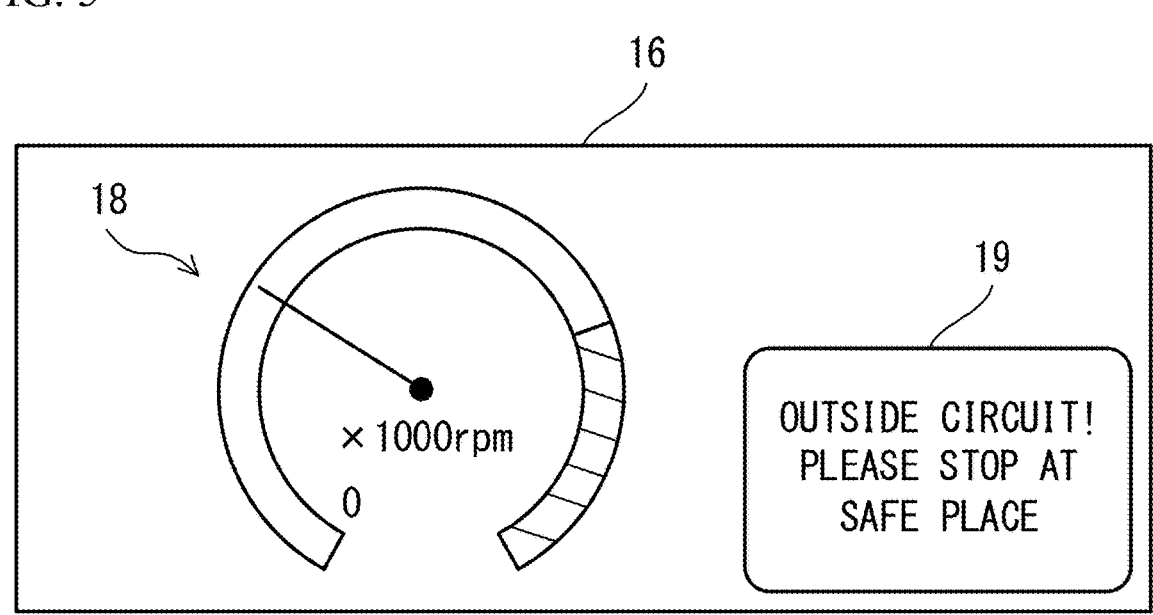
FIG. 5 is an example of a display device including a stop request display.

As described above, when the vehicle 10 move from the inside to the outside of the circuit C1, the meter ECU 17 outputs a stop request display 19 for requesting the vehicle 10 to stop to the display device 16 as illustrated in FIG. 5 based on the instruction transmitted from the server 20. The stop request display 19 is output near a tachometer 18. Thus, it is assumed that the driver 10D shifts to an action of stopping the vehicle 10 by the brake operation. The engine ECU 15 turns off the circuit mode after the vehicle 10 stops. If the engine ECU 15 turns off the circuit mode while the vehicle 10 is traveling, the behavior of the vehicle 10 might not be stable. The engine ECU 15 turns off the circuit mode after the vehicle 10 is stopped, thereby suppressing such instability.

Further, the engine ECU 15 turns off the circuit mode when not receiving the electrical signal transmitted from the DCM-ECU 12. If the engine ECU 15 does not receive signals from the DCM-ECU 12, the vehicle 10 may behave differently from the circuit mode specifications. By turning off the circuit mode, the engine ECU 15 avoids such behavior.

In addition, the engine ECU 15 excludes the determination related to the fail-safe control for the engine 14 from the time when the starter 14A is turned on to the time after a predetermined offset time elapses from the time when the starter 14A is turned off. The fail-safe control includes, for example, a limitation on the maximum rotation speed of the engine 14. The fail-safe control includes a limitation on the amount of air taken into the engine 14, a limitation on the voltage of a battery mounted on the vehicle 10, and the like. The offset time is set from several tens of milliseconds to several hundreds of milliseconds.

The reason why the determination regarding the fail-safe control is excluded is as follows. When the engine 14 is started in the circuit mode while the ignition switch is turned on and the engine 14 is stopped, the circuit mode is released due to a voltage drop that occurs at the time when the starter 14A is turned on. That is, the circuit mode is dynamically switched from ON to OFF due to the voltage drop. In this case, the driver 10D is requested to switch the circuit mode to ON again. As a result, the satisfaction level of the service of conveying the enjoyment of motor sports to the driver 10D may decrease. By temporarily excluding the determination related to the fail-safe control, the dynamic cancellation of the circuit mode is avoided. This suppresses the above-described decrease in satisfaction.

Although some embodiments of the present disclosure have been described in detail, the present disclosure is not limited to the specific embodiments but may be varied or changed within the scope of the present disclosure as claimed.

For example, the first condition and the second condition are used as an example of the specific combustion conditions in the above description. However, the specific combustion condition may be one of the first condition and the second condition. Further, when four or more combustion conditions are employed, the first condition, the second condition, and the third condition may be employed as the specific combustion conditions.

What is claimed is:

1. A vehicle with an engine, the vehicle comprising an engine control unit configured to control the engine in a circuit mode m which a traveling performance of the vehicle is improved, on a basis of a request transmitted from a portable terminal, when the portable terminal operated by a user of the vehicle determines that a current position of the vehicle equipped with the engine is in a circuit, wherein the engine control unit is configured to reject switching to the circuit mode regardless of the request, when the engine control unit determines that a part of combustion conditions among all combustion conditions for stable combustion of fuel supplied to the engine in the circuit mode is not satisfied, and the engine control unit is configured to turn off the circuit mode, after the vehicle stops so as to stabilize behavior of the vehicle, in a case where the engine control unit determines that the part of the combustion conditions is not satisfied while the engine is controlled in the circuit mode and the vehicle is traveling.

2. A vehicle with an engine, the vehicle comprising an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit; and a display control unit configured to control display of a display device provided in a vehicle cabin of the vehicle, wherein the engine control unit is configured to reject switching to the circuit mode regardless of the request, when the engine control unit determines that a part of combustion conditions among all combustion conditions for stable combustion of fuel supplied to the engine in the circuit mode is not satisfied, the display control unit is configured to output a display requesting the vehicle to stop to the display device, on a basis of an instruction transmitted from the portable terminal, when the portable terminal determines that the current position of the vehicle is outside the circuit, and the engine control unit is configured to turn off the circuit mode, after the vehicle stops so as to stabilize behavior of the vehicle.

3. A vehicle with an engine the vehicle comprising an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit; and a communication control unit provided in the vehicle and configured to control communication between the portable terminal and the engine control unit, wherein the engine control unit is configured to reject switching to the circuit mode regardless of the request, when the engine control unit determines that a part of combustion conditions among all combustion conditions for stable combustion of fuel supplied to the engine in the circuit mode is not satisfied, and the engine control unit is configured to turn off the circuit mode, when the engine control unit does not receive a signal transmitted from the communication control unit.

4. A vehicle with an engine the vehicle comprising an engine control unit configured to control the engine in a circuit mode in which a traveling performance of the vehicle is improved, on a basis of a request transmitted from a portable terminal, when the portable terminal operated by a user of the vehicle determines that a current position of the vehicle equipped with the engine is in a circuit, wherein the engine control unit is configured to reject switching to the circuit mode regardless of the request, when the engine control unit determines that a part of combustion conditions among all combustion conditions for stable combustion of fuel supplied to the engine in the circuit mode is not satisfied, the engine control unit is configured to exclude determination related to fail-safe control for the engine during a period from a first time to a second time, the first time is a time when a starter for starting the engine is turned on, and the second time is a time when a predetermined time elapses from a time when the starter is turned off.

* * * * *